United States Patent [19]

Sihvonen et al.

[11] 3,839,083

[45] Oct. 1, 1974

[54] SELECTIVE METALLIZATION PROCESS

[75] Inventors: Yro T. Sihvonen, Richardson; Jack D. Woodham, Jr., Irving, both of Tex.

[73] Assignee: Texas Instruments Incorporated, Dallas, Tex.

[22] Filed: Oct. 6, 1972

[21] Appl. No.: 295,762

[52] U.S. Cl. .................. 117/212, 117/37 R, 117/45, 117/71 R, 117/130 E, 117/160 R, 117/215, 117/217

[51] Int. Cl. .............................................. B44d 1/18

[58] Field of Search ......... 117/35 S, 37 R, 45, 47 R, 117/50, 47 H, 47 A, 71 R, 130 E, 160 R, 212, 215, 217; 106/1; 204/38 B

[56] References Cited

UNITED STATES PATENTS

| | | | |
|---|---|---|---|
| 3,367,792 | 2/1968 | Levine | 117/47 |
| 3,562,005 | 2/1971 | De Angelo | 117/212 |
| 3,562,038 | 2/1971 | Shipley et al. | 156/3 |
| 3,619,285 | 11/1971 | Feldstein | 117/212 |
| 3,672,925 | 6/1972 | Feldstein | 117/5.5 |
| 3,676,213 | 7/1972 | Marton | 117/212 |
| 3,772,078 | 11/1973 | Polichette et al. | 117/212 |

*Primary Examiner*—Herbert B. Guynn
*Assistant Examiner*—Bruce H. Hess
*Attorney, Agent, or Firm*—Harold Levine; Edward J. Connors, Jr.; William E. Hiller

[57] ABSTRACT

A process is disclosed for effecting selective metal deposition on insulating substrates. The substrate surface is conditioned and sensitized with suitable chemical solutions. The surface is then patterned by selective application of heat, such that unexposed areas are effective to reduce a precious metal from a precious metal salt solution. Electroless plating is then effective to form continuous metallic patterns. In a preferred embodiment this substrate is immersed in a solution containing tin chloride, the oxidation state of the metal ion thereof being alterable by exposure to heat. Subsequent to patterning, the unaltered metal ion is effective to reduce palladium from a palladium salt solution. The substrate surface is first conditioned to produce uniform metallization by immersing it in a solution containing a sodium salt of a strong base and a relatively weaker acid to produce a high density of nucleation sites.

14 Claims, 5 Drawing Figures

SELECTIVE METALLIZATION PROCESS

Figure 1:
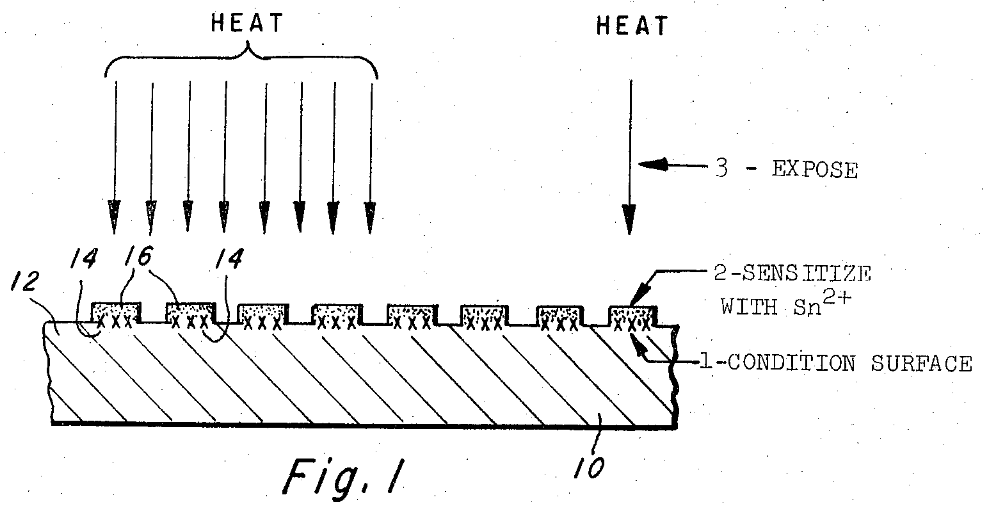

The present invention pertains to selective metallization processes in general, and more particularly to a process which includes patterning a surface by application of heat to vary the oxidation state of the metal ion of a metal salt coating such that subsequently a precious metal is reduced from a precious metal salt solution in regions where the oxidation state of the metal ion has not been altered, and is not reduced in regions where the oxidation state of the metal ion has been altered.

In the electronics industry there have been great strides made in recent years toward reducing costs of electrical circuits, the primary innovations being introduction of integrated circuits and printed circuits. Even though such circuits have substantially reduced costs, further reductions would be possible if an automated assembly process were available for effecting chip packaging and printed circuit board definition. In this respect, a common carrier interconnect, metal-on-plastic, e.g., that accepts a beam lead or raised bump chip and carries it through encapsulation is desirable, since simultaneous multiple bonding can be used to replace the manual operation of making point-by-point wire bonds between chip and frame, and handling of individual chips is avoided.

Common carrier interconnects can be made by one of several well established means such as vacuum evaporation through masks, sputtering and etching, or etching of metal-plastic laminates but these are not compatible with the concept of continuous processing. Continuous metal plating of plastic offers an attractive alternative, but the formation of patterns utilizing conventional techniques requires photoresist masking and etching at relatively high cost per part.

A continuous processing selective plating technique which does not require photoresist masking is described in U.S. Pat. No. 3,562,005. This technique utilizes the fact that metal deposition in the well known tin-sensitizer + palladium-activator plating procedure can be inhibited by ultraviolet exposure. Using this process, to selectively metallize on dielectric substrates it is necessary to provide a catalytic patterned surface capable of initiating electroless metal deposition. This is done, by way of illustration, by applying a surface conditioner to create surface sites S*. Next, there is sensitization with stannous tin absorption $$Sn^{2+} + S^* \rightarrow S^*{:}Sn^{2+}.$$

This is followed by selective photo-oxidation to stannic tin: $S^*{:}Sn^{2+} + \frac{1}{2}O_2 + h\gamma \rightarrow S^*{:}Sn^{4+}$.

There is then activation with a palladium catalyst:

$$S^*{:}Sn^{2+} + Pd^{2+} \rightarrow S^*{:}Pd + Sn^{4+}$$

Next there is deposition of a metal film M:

$$S^*{:}Pd + M^{n+} + ne^{1-} \rightarrow S^*{:}Pd{:}M$$

wherein: denotes adherence bonds.

Subsequent build-up of the metal film thickness can proceed either electrolessly, if the type of solution is autocatalytic, or by normal electroplating.

While the selective metallization process disclosed in the aforementioned patent does provide a continuous process, numerous disadvantages are present. By way of example, it is extremely difficult to commercially provide a suitable ultraviolet source and projection system required in that process.

Accordingly, an object of the present invention is the provision of an improved selective metallization process for generating metal reducing patterns.

Another object of the invention is the provision of a new and improved method of generating, on a substrate, a pattern capable of reducing thereon a precious metal, which subsequently is effective as a reduction catalyst in an electroless plating process.

Yet another object of the invention includes a process of producing a pattern on an insulating substrate which pattern is effective as a catalyst in the electroless reduction of a conductive metal circuit pattern wherein conventional masking, etching, mask removal, curing, silk screening, binders, adhesive, emulsions, photoresists, and undue material waste are eliminated.

Still another object of the invention is a new and improved method of generating, on a substrate, a pattern capable of reducing thereon a precious metal, wherein selective application of heat is utilized to alter the oxidation state of a metal ion to control subsequent reduction of the precious metal.

Briefly and in accordance with the invention, a method for selectively depositing a conductive layer on an insulating substrate includes immersing the substrate in a solution containing a salt of a metal wherein the oxidation state of that metal ion can be altered responsive to application of heat. Next the substrate and solution coating thereon are selectively exposed to heat to produce a preselected pattern corresponding to the desired metallization pattern, the portion not exposed to heat effective to subsequently reduce a precious metal from a precious metal salt. Then the structure is placed in an electroless plating bath, the reduced precious metal acting as a catalyst to produce the desired metal pattern.

In a preferred embodiment nucleation sites or reception centers are formed on the substrate surface prior to immersion in the metal salt solution. This is effected by immersing the substrate in a solution containing a sodium salt of a strong base and a relatively weaker acid.

Figure 5:
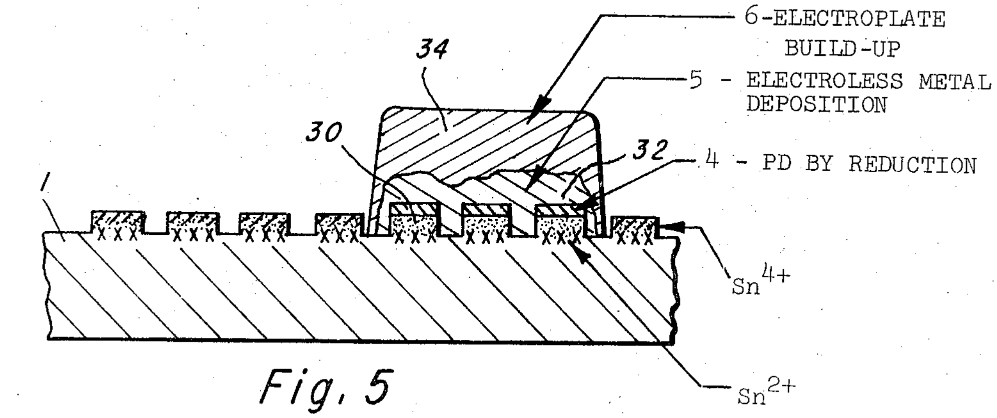
Figure 2:
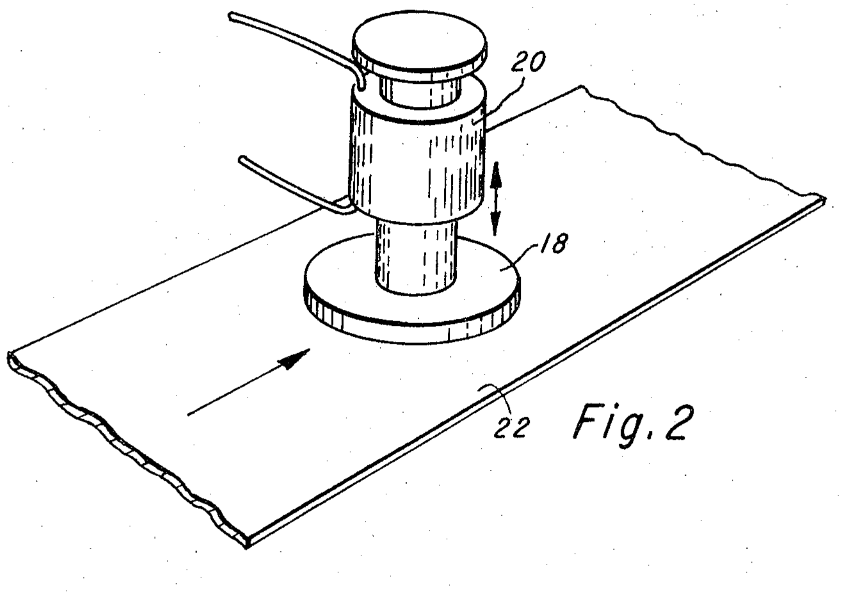
Figure 3:
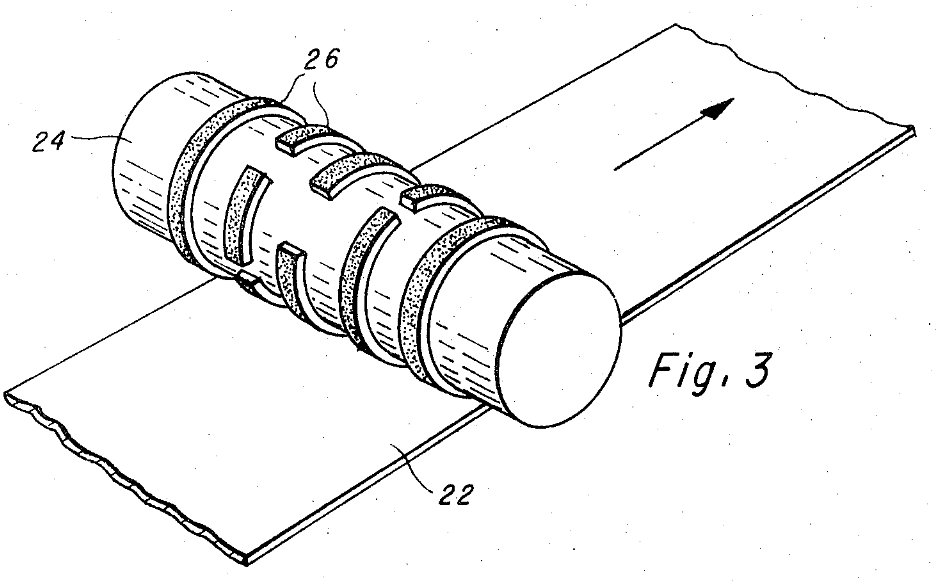
Figure 4:
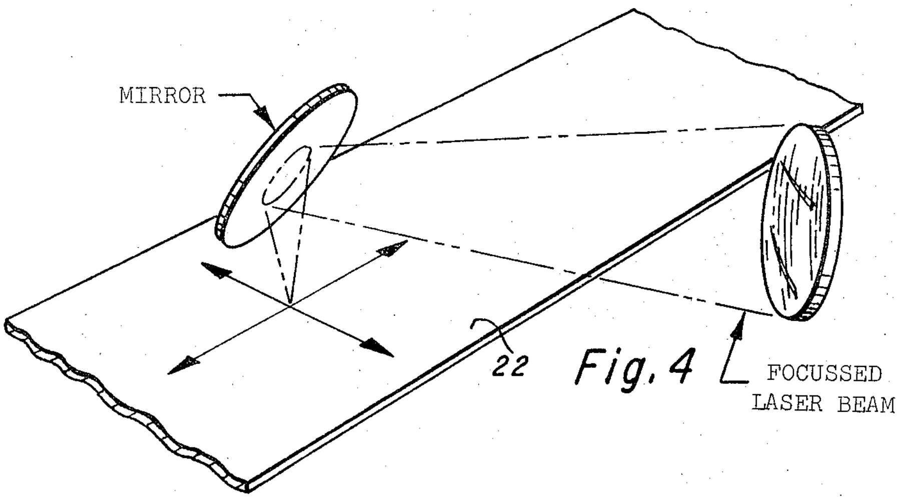

Other objects and advantages of the invention will be apparent upon reading the following detailed description of illustrative embodiments in conjunction with the drawings wherein:

FIG. 1 is a cross-section of a substrate diagrammatically illustrating a sensitized substrate in accordance with the invention wherein heat is selectively applied;

FIGS. 2–4 pictorially illustrate suitable techniques for selectively applying heat to a substrate; and FIG. 5 is a cross-section of a substrate depicting a portion of a metallized pattern in accordance with the invention.

With reference now to the drawings, and for the present to FIG. 1, a suitable substrate is shown at 10. Conditioning the substrate surface 12 so that it becomes uniformly receptive to subsequent deposition of solution chemicals in accordance with the invention is very important in effecting uniform metal coverage and strong adhesion. Each substrate species usually requires a different treatment so that the sensitizing solution is retained as an unbroken film after the surface is immersed therein. Hydrophilic materials need little more than a simple cleanup or a mild etch, whereas hydrophobic materials may require the use of wetting promoters of the first or second class.

Good wettability of a substrate surface does not necessarily ensure that good metal adhesion will result. Best adhesion results from either true chemical bonding between the sensitizer colloid and the substrate atoms, or by physical interlocking of the deposited metal within surface micro-cavities. Achieving either of these may sometimes require a separate preconditioning step.

It is required that the substrate 10 be electrically insulating in order to enable selective patterning in accordance with the invention. Suitable substrate materials include polyimide plastic, epoxy composite, polyester, polyaryl sulfone, sapphire, polysulfone, ABS plastic, lead ziconate titanate, lava, and alumina.

By way of illustration the present invention will be described with reference to forming a metallized pattern on a polyimide substrate. The substrate surface 12 is prepared by first cleaning it and then providing a high density of nucleation sites or reception centers to ensure uniform metallization in subsequent steps. The cleaning procedure, by way of example, may include first soaking the substrate in a room temperature solution of 400 ml $H_2O_2$(30%) + 1,000 ml $H_2SO_4$ concentrated for two minutes followed by a water rinse. A second cleaning for 2 minutes is made in a room temperature 1:1 solution of HCl + $H_2O$ followed by a water rinse and a dry nitrogen blow-off.

A suitable nucleation step involves a two minute immersion of the substrate in 100g $Na_4P_2O_7.10\ H_2O$ in 1 liter $H_2O$, followed by a ten second D.I. water rinse. In general, the nucleating step includes immersing the substrate in a solution containing a sodium salt of a strong base and a relatively weaker acid. Other exemplary solutions in addition to the aforementioned sodium pyrophosphate solution include a solution of sodium hydroxide (NaOH), or sodium hypophosphite ($NaH_2PO_2 . H_2O$).

The first two cleaning steps etch and condition the substrate surface while the nucleation step is found beneficial in both accelerating the thermal exposure time and promoting good metal coverage. The nucleation sites are depicted generally at 14 in FIG. 1.

Sensitizing the substrate surface 12 for heat exposure in accordance with the invention involves immersing the conditioned substrate (typically 1 minute) in a tin chloride solution in the proportions of:

25 grams $SnCl_2 . 2H_2O$ + 40 milliliter HCl + 1 liter $H_2O$. The tin, in the form of a hydrate, forms a high density of minuscule islands, referenced generally at 16, approximately 5 nm in diameter and separated by about 10 nm. This step is followed by a vigorous D.I. water immersion which removes excess tin and perhaps causes further tin hydrolysis. If the water treatment is adequate, the substrate may be dried by any one of several methods — such as flowing nitrogen, sponging, squeegeeing, blotting, etc. Improper water treatment causes the tin hydrate to vary in density (and prehaps species) on the surfaces and this is seen as "streaking " when the electroless plating metal begins to deposit.

The tin chloride sensitizing solution is believed to be a suspension of colloidal particles based on $Sn^{4+}$, with $Sn^{2+}$ rich outer layers, in a bath of both complexed and uncomplexed $Sn^{2+}$ ions. With time, the solution will slowly absorb atmospheric oxygen becoming cloudy in appearance but its effectiveness is not greatly impaired since the newly formed $Sn^{4+}$ molecule simply acts as a nucleating center for forming another colloid particle. While depletion of the sensitizing colloid species from solution is a possibility, a simple estimate based on the known coating density of 5–10 $\mu g/cm^2$ indicates that bulk depletion (due to mechanical carry out on the substrate) will severely reduce the bath volume long before the colloid is exhausted. Tin chloride is the preferred sensitizing solution; other suitable sensitizing solutions include salts of titanium and lead.

After sensitizing the substrate in the $SnCl_2$ solution as above described, the substrate is ready for thermal patterning. Three suitable techniques for thermally selectively impeding metal deposition are depicted in FIGS. 2–4. The "brander " technique is depicted in FIG. 2 and is a stop-and-print technique that utilizes an embossed design on an element 18 which is momentarily touched onto the sensitized substrate surface 22 and tin islands thereon. A solenoid 20 may be utilized to bring the element 18 into contact with the substrate surface.

The "roller" technique, FIG. 3, utilizes an embossed design shown generally at 26 which rolls as the substrate 22 moves. The design is embossed around the circumference of a drum 24. The drum may be heated by suitable known techniques.

A third technique for selectively heating the substrate 22 is illustrated in FIG. 4, and includes a laser. The laser utilizes a finely focussed spot which can be moved and/or blanked to trace out required patterns. In this approach, the photon wavelength must be selected such that localized surface absorption and heating occurs on the substrate.

The optimum exposure times required to pattern the substrate are two involved with complicated heat flow parameters and geometries to allow universal exposure conditions to be specified. Generally speaking, however, higher temperatures allow shorter dwell times and least lateral and bulk spreading of the heated zone, but too high a temperature can cause substrate surface damage. Lower temperatures require longer dwell times which cause fuzzier images. Minimum temperatures to cause the $Sn^{2+}$ to $Sn^{4+}$ conversion is of the order of 150°C.

The next step in the metallization process is an activation step which prepares the unheated substrate regions to act as catalysts for metal depostion. The substrate is immersed in a non-critical precious metal salt solution, such as palladium, viz., 1.25 g $PdCl_2$ (99%) + 10 ml HCl in 1 liter $H_2O$, for a one-half to 1 minute interval, and is followed by a D.I. water rinse of equal duration. The small amount of HCl used assists palladium chloride solution via formation of the complex tetrachloride ion $(PdCl_4)^{2-}$. The bath is extremely stable, and drag-out is more detrimental than palladium exhaustion in terminating its effective life. The rinse step removes palladium solution and any loose metal, either of which can cause catastrophic electroless plating bath failure. Salts of other precious metals such as iridium, osmium, platinum, rhodium, ruthenium, gold, and silver may be used if desired.

The $S^{2+}$ regions on the substrate surface act to galvanically reduce palladous ions to the metal covering the active sensitizer sites with ultrathin discontinuous palladium deposits 30 (FIG. 5). Surfaces thus treated are sometimes faintly visible under ideal lighting conditions. They remain in an activated state for hours, and even days; but as with the sensitization step, best results are probably obtained if the activated surface is processed further as soon as possible. A properly seeded surface is sufficiently uniform that subsequent coatings of electroless metal such as copper and nickel result in essentially continuous metallic films even in thicknesses as little as 0.1–0.2$\mu$m.

The palladium sites 30 formed on the substrate surface during the activation step serve to initiate electroless plating. Upon immersion, the sites grow until a visible continuous metallic film 32 becomes manifest. If the electroless solution is of the "chemical deposition " type, the film thickness will stop increasing when the coverage is complete. "Autocatalytic" solutions initiate and continue depositing metal atoms at a 1 to 3 $\mu$inch per minute rate as long as the substrate is submerged. Most commericial electroless copper-based plating preparations are capable of long life providing manufacturers' instructions are followed pertaining to operating parameters, cleanliness, replenishment, and storage. Satisfactory for the present invention are: PTH 9072D/9073D (Mac Dermid, Inc.) and CUPOSIT 328-A-B-C (Shipley Co.), each followed by a thorough D.I. water rinse to remove all residues. The latter company's CP-70, CP-70A, and 328-A-S-C are also useful for specific applications.

In many applications metallized films thicker than that provided by the electroless solution may be required. Rapid electroplate buildup of a metallized pattern in accordance with the invention is a natural recourse in such a situation. In general, numerous metals and alloys can be electroplated from a variety of different solutions using a multitude of techniques. An electroplate build-up is illustrated in FIG. 5 at 34.

One suitable copper plating solution, applicable to many substrate materials, is $$75g\ CuSO_4 . 5H_2O + 2.5g\ H_2SO_4 + 1\ liter\ H_2O.$$

This is a "starved " version of standard types of copper sulfate mixes which incorporate considerably more copper salt and acid. Its use as an initial plating step is least pernicious to adhesion at the electroless copper-polyimide plastic interface. Adhesion is also optimum if the solution is circulated through a filter during use. Another advantage of this plating solution is its slowness in removing electroless copper films in the absence of plating voltage. After some 2.5¾m (approximately 100 $\mu$inches) of copper is plated, a switch to a "richer" sulfate bath can be made to allow for faster deposition rates.

Plating currents for the "starved" copper sulfate mix should generally not initially exceed 5.0 mA per $\mu$inch of electroless copper thickness on polymide plastic. Larger currents cause excessive heating which can destroy the interface bond. Plating proceeds in accordance with the relation $$T = T_o + 135\ It/A,$$

where T = total copper thickness ($\mu$inch),
$T_o$ = initial copper thickness ($\mu$inch),
I = plating current (ampere),
t = plating time (minute), and
A = plated area ($inch^2$),
As metal deposition proceeds, plating currents can be progressively increased as long as the aforementioned current limitation is not exceeded.

Copper fluoborate (HI-THRO; Allied Chemical Corporation) plating is also compatible with heat impeded metal deposition processed copper and is capable of very high rates of deposition.

Two attractive features of the heat impeded metal deposition in accordance with the present invention are: first, the variety of ways by which patterns can be made (with and without optics), and second, the quickness at which the $Sn^{2+}$ to $Sn^{4+}$ conversion takes place.

While the present invention has been described with respect to illustrative embodiments, it will be apparent to those skilled in the art that various changes may be made without departing from the scope or spirit of the invention.

What is claimed is:

1. In a method for selectively depositing a precious metal on an insulating substrate, the steps of:

immersing said substrate in a solution containing a salt of a metal selected from the group consisting of tin, titanium and lead, the oxidation state of the metal ions thereof being alterable by exposure to heat, to provide a coating of said solution on said substrate; and producing a pattern capable of reducing said precious metal from a precious metal salt thereof by selectively exposing portions of said coated substrate to heat to effectively change the oxidation state of said metal ions at said portions with the result that said metal ions of said portions of said coated substrate so exposed to heat are rendered incapable of reducing said precious metal.

2. The method as set forth in claim 1 wherein said metal ions are capable of reducing said precious metal.

3. The method as set forth in claim 2 wherein said metal salt in said solution is a halide.

4. The method as set forth in claim 3 wherein said portions of said coated substrate are selectively exposed to heat so as to raise the temperature thereof to a minimum temperature on the order of 150°C.

5. The method as set forth in claim 4 including the step of immersing said substrate in a nucleating solution containing a sodium salt of a strong base and a relatively weaker acid prior to the immersion of said substrate in the solution containing a salt of a metal selected from the group consisting of tin, titanium, and lead.

6. The method as set forth in claim 5 wherein said nucleating solution comprises sodium pyrophosphate.

7. The method as set forth in claim 5 wherein said nucleating solution comprises sodium hypophosphite.

8. The method as set forth in claim 5 wherein said nucleating solution comprises sodium hydroxide.

9. A method for selectively depositing a metal at least partially by electroless plating on an insulating substrate to form a metallic pattern comprising the steps of:

immersing said substrate in a first solution containing a sodium salt of a strong base and a relatively weaker acid to produce a high density of nucleation sites;

immersing said substrate in a second solution containing a salt of a metal selected from the group consisting of tin, titanium and lead, the oxidation state of the metal ions thereof being alterable by exposure to heat, to provide a coating of said second solution on said substrate;

producing a pattern capable of reducing a precious metal from a precious metal salt by selectively exposing portions of said coated substrate to heat to effectively change the oxidation state of said metal ions at said portions with the result that said metal ions of said portions of said coated substrate so exposed to heat are rendered incapable of reducing said precious metal;

immersing said substrate in a precious metal salt solution to reduce said precious metal on said pattern; and placing said precious metal pattern in an electroless plating bath which is catalyzed by said reduced precious metal to produce a selective metal deposit forming the metallic pattern.

10. A method as set forth in claim 9 wherein said metal salt is tin chloride.

11. A method as set forth in claim 10 wherein said precious metal is palladium.

12. The method as set forth in claim 11 wherein said first solution comprises sodium pyrophosphate.

13. The method as set forth in claim 11 wherein said first solution comprises sodium hypophosphite.

14. The method as set forth in claim 11 wherein said first solution comprises sodium hydroxide.

* * * * *